United States Patent [19]

Hay

[11] 3,884,091

[45] May 20, 1975

[54] PITMAN SHAFT AXIAL SELF-ADJUSTING DEVICE

[75] Inventor: Charles N. Hay, Sandusky, Ohio

[73] Assignee: General Motors Corporation, Detroit, Mich.

[22] Filed: Apr. 12, 1974

[21] Appl. No.: 460,335

[52] U.S. Cl. .................................. 74/499; 74/398
[51] Int. Cl. ..................... B62d 1/20; F16h 35/06
[58] Field of Search ................... 74/498, 499, 398

[56] References Cited
UNITED STATES PATENTS
3,756,125   9/1973   Forster et al. .................. 74/499 X

*Primary Examiner*—Leonard H. Gerin
*Attorney, Agent, or Firm*—Arthur N. Krein

[57] ABSTRACT

A device for maintaining axial self-adjustment of the pitman shaft in a manual steering gear assembly, the device including a flanged shaft extension secured to the end of the pitman shaft within the housing of the steering gear assembly, the shaft extension rotatably supporting a pair of cams which are fixed together to provide cam slots therebetween engaged by cam elements of a support cam non-rotatably fixed to the housing, the cams being rotatably biased in an up-ramp direction relative to the support cam by a spring to effect axial adjustment of the pitman shaft, a cam locking device being operatively connected to the cams to permit this axial adjustment to be accomplished only when the steering gear is essentially centered and to prevent axial adjustment during turning of the steering gear in either direction from the centered position.

7 Claims, 5 Drawing Figures

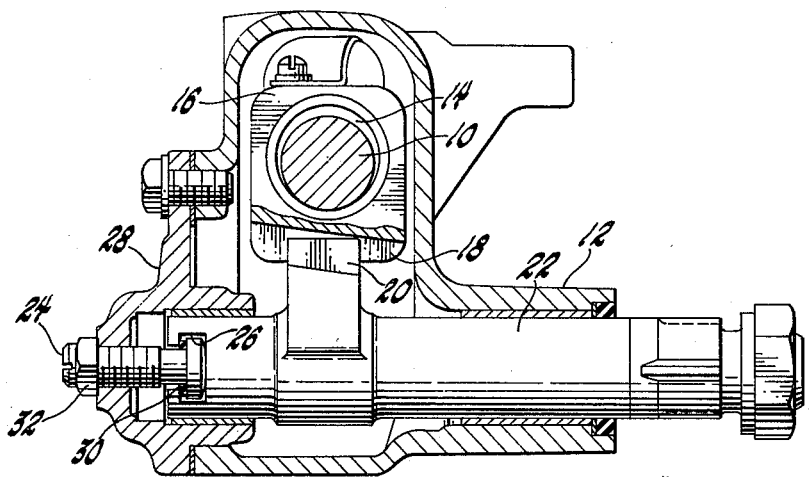
Fig.1 "PRIOR ART"
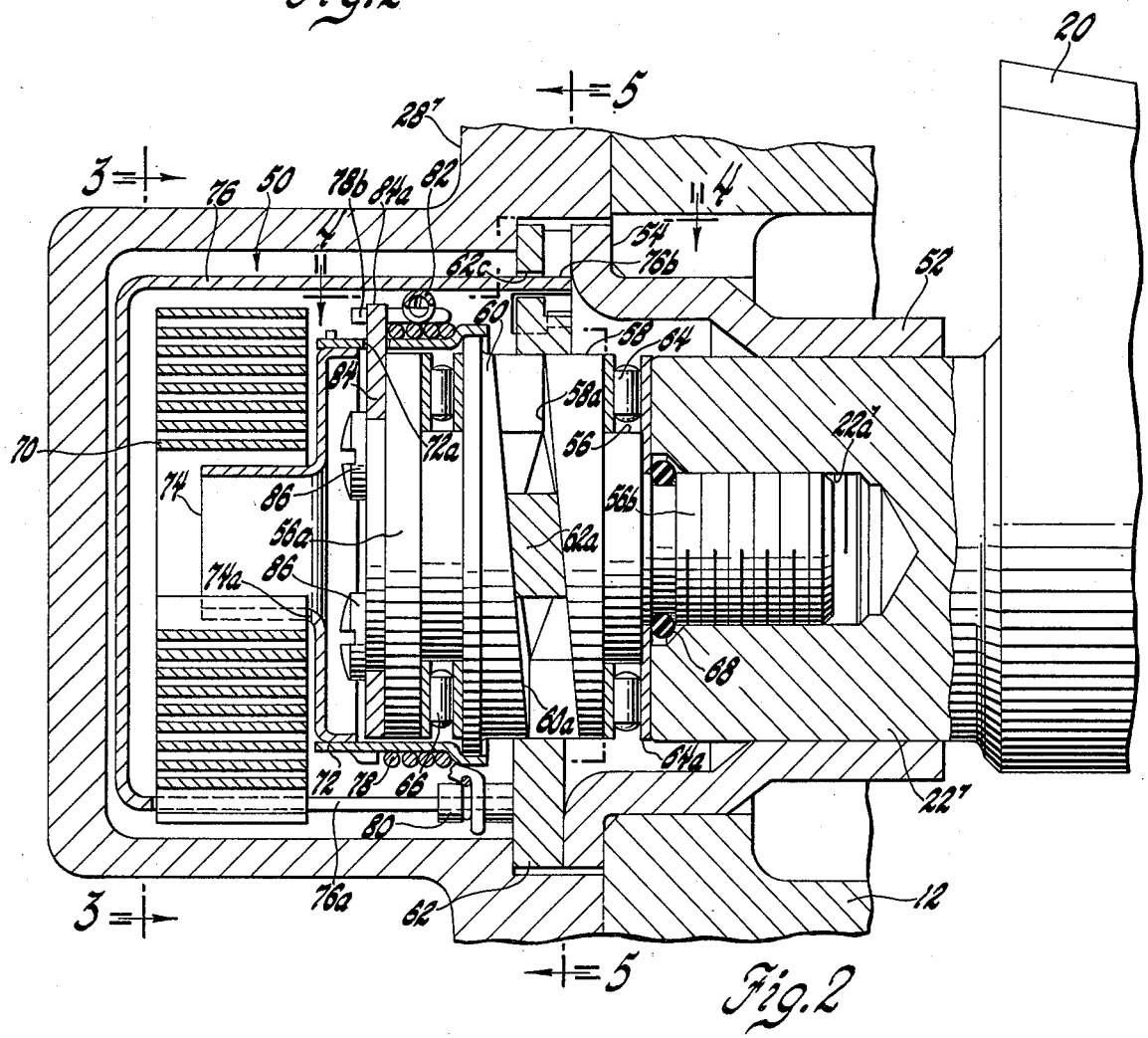
Fig.2

PITMAN SHAFT AXIAL SELF-ADJUSTING DEVICE

This invention relates to an axial self-adjusting device for a pitman shaft or similar element and, in particular, to an axial self-adjuster for maintaining automatically the axial adjustment of the pitman shaft in a manual steering gear assembly.

In various mechanisms, a shaft is rotatably journalled within a housing to cooperate with other machine elements of the mechanism in such a manner whereby axial alignment of the shaft must be maintained to permit proper operation of the mechanism. One such mechanism is a manual steering gear assembly of the type used in automative vehicles. In such a manual steering gear assembly, it is necessary to adjust the pitman shaft of this assembly axially for proper meshing of the teeth of its sector gear with those on the ball nut that rides the steering worm shaft of such an assembly. It is also necessary in such a steering gear assembly to provide means for axial take-up on the pitman shaft to compensate, for example, for wear of the gear teeth. This is not readily accomplished because of the additional need for axial restraint of the pitman shaft in both directions against the heavy axial forces transmitted to the pitman shaft through the pitman arm during steering of the vehicle.

It is therefore the primary object of this invention to provide a device for the axial self-adjustment of the pitman shaft of a manual steering gear assembly or of the shaft of a similar type mechanism.

Another object of this invention is to provide an axial adjuster for a shaft, such as the pitman shaft of a manual steering gear assembly, which is self-adjusting for original axial adjustment of the shaft and for axial take-up adjustment, as necessary, required due to wear of the various elements in the assembly.

These and other objects of the invention are obtained by a self-adjuster including a pair of opposed annular cam elements rotatably mounted on a shaft extension extending axially from the end of the pitman shaft of a manual steering gear assembly, the cam elements providing at least a pair of cam slots therebetween adapted to receive corresponding extension cams of a support cam encircling the cam elements and shaft and fixed against rotation relative to these cams, the cam elements being rotatably biased by a spring, connected thereto and to a fixed support, in an up-ramp direction relative to the support cam to effect axial adjustment of the pitman shaft, a cam locking device being operatively connected to the shaft extension and to the cams whereby axial self-adjustment of the pitman shaft can only occur when the steering gear and therefore the pitman shaft is rotatably centered.

For a better understanding of the invention, as well as other objects and further features thereof, reference is had to the following detailed description of the invention to be read in connection with the accompanying drawings, wherein:

FIG. 1 is a view, partly in section, of a manual steering gear assembly for an automotive vehicle, this assembly being shown with a typical prior art axial adjuster for the pitman shaft of the assembly;

FIG. 2 is an enlarged view of a portion of a manual steering gear assembly having an axial self-adjuster, in accordance with the invention, coupled to the pitman shaft of this assembly, the elements of the self-adjuster being shown rotated (90°) from their normal position for the purpose of illustrating more clearly the operational inter-relationship of the various elements of the self-adjuster;

Figure 3:
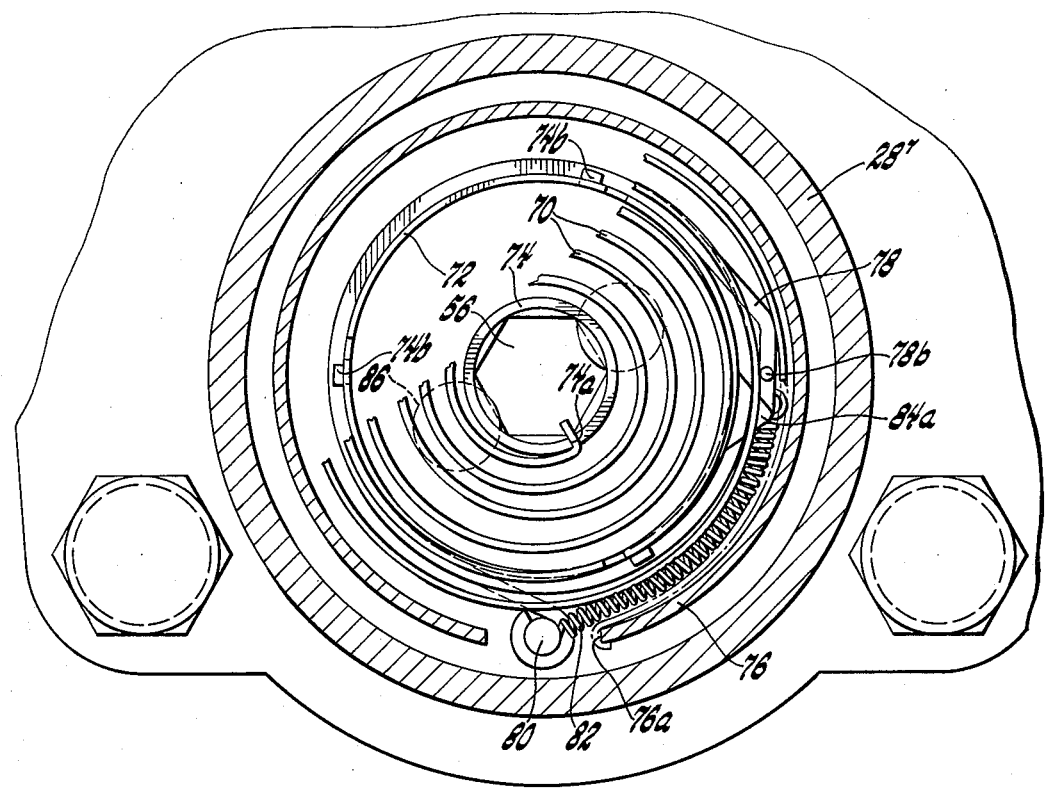
FIG. 3 is a sectional view of the axial self-adjuster taken along line 3—3 of FIG. 2 and with parts properly orientated and with parts broken away to show details of the structure.

Referring first to FIG. 1, a conventional manual steering gear assembly for an automotive vehicle includes a steering shaft 10, suitably journalled in a portion of the steering gear housing 12. Worm gear teeth 14 are located on the lower end of the steering shaft 10 and a ball nut 16 is mounted on this worm and has mating spiral grooves in which steel balls, not shown, circulate to provide a low friction drive between the worm 14 and the ball nut 16. External teeth 18 on the ball nut 16 engage sector teeth 20 on a pitman shaft 22, also suitably journalled in the housing 12. The teeth 18 on the ball nut are made so that a "high point" or tighter fit exists between the ball nut and the sector teeth of the pitman shaft when the vehicle front wheels are in the straight-ahead position. The pitman shaft sector teeth are slightly tapered so that a proper lash may be obtained by moving the pitman shaft axially or endwise to the right, as seen in this figure, by means of a suitable axial adjuster.

One such conventional axial adjuster commonly known in the prior art is illustrated in FIG. 1 and includes a threaded screw 24 with its head rotatably attached in the T slot 26 in the inner end of the pitman shaft 22. Screw 24 extends axially from the pitman shaft 22 and is threaded through the gear housing side cover 28, suitably secured to the housing 12. In one arrangement of this axial adjuster, a selectively fitted, replacement shim 30 fits snugly with the head of screw 24 in the T slot 26 whereby the screw 24 is used to adjust the pitman shaft 22 axially and to control the end play of this pitman shaft, with axial adjustment of screw 24 then being fixed by a lock nut 32 threaded onto the end of the screw 24 into abutment against the side cover 28.

Referring now to the subject matter of the invention, there is shown in FIG. 2 a preferred embodiment of an axial self-adjusting device or self-adjuster, generally designated 50, which is used for the purpose of illustration to axially adjust the pitman shaft of a manual steering gear assembly. As shown, the self-adjuster 50 is positioned within the cup-shaped side cover 28' of this assembly adjacent to the inner or sector end of the pitman shaft 22' which is journalled in the housing 12 at this end by a flanged stepped bushing 52 supported in the housing 12 concentric to the pitman shaft. The radial flange 54 of bushing 52 abuts against the outer surface of the housing 12 and is fixed against rotation relative to the housing in a suitable manner, as by providing the peripheral edge of the flange 54 with suitable scalloped notches which are adapted to receive corresponding shaped radial extensions in the stepped bore of the side cover 28' fixed to the housing 12.

A shaft extension 56 fixed to extend axially from the pitman shaft 22' is used to support other elements of the self-adjuster between the end of the pitman shaft 22' and the inside surface of the radial flange 56a of the shaft extension 56 adjacent to the free end thereof. In the embodiment illustrated, the shaft extension 56 is in the form of a shouldered, internal wrenching head screw having threads at its reduced end 56b for engagement into the axially stepped and threaded bore 22′a in the inner end of the pitman shaft 22′.

A pair of annular washer-like cam elements, referred to as inner cam 58 and outer cam 60, rotatably encircle the shoulder of shaft extension 56. Each of these cam elements is provided, in the embodiment illustrated, with a pair of equally spaced apart, semi-circular, axially extending cam surfaces or cam ramps 58a, and 60a. The inner cam 58 and outer cam 60 are suitably secured together, as by pins 59, on one cam element extending into suitable apertures in the adjacent cam, with their cam surfaces in abutment against each other to provide a pair of cam slots whereby an annular support cam 62 can have its radially inwardly extending extension cams 62a engaged into these cam slots.

The cams 58 and 60 are each provided with a central aperture therethrough of an internal diameter to provide clearance between each of these cams and the outer peripheral surface of the shouldered portion of shaft extension 56 and they are isolated from rotation of the pitman shaft 22′ and of shaft extension 56 fixed thereto by thrust needle bearings, identified as inner and outer bearings 64 and 66, respectively, encircling the shouldered portion of the shaft extension 56 on opposite sides of these cams 58 and 60, with the inner bearing 64 sandwiched between the cam 58 and the end of pitman shaft 22′ and the outer bearing 66 sandwiched between cam 60 and flange 56a.

As seen in FIG. 2, the outer race or right-hand race 64a of bearing 64 is sandwiched between the end of the pitman shaft 22′ and the shoulder of shaft extension 56 with an O-ring 68 positioned on extension 56 to serve as a retainer during assembly.

Support cam 62, in the form of an apertured disk, is provided with a pair of inward radially extending and axially angled extension cams 62a, only one of which is seen in FIG. 2, which project into the cam slots provided for this purpose between the two cams 58 and 60, the extension cams 62a being formed complementary to the cam surfaces of cams 58 and 60 for sliding movement relative thereto in a manner and for a purpose to be described. The radially outward end surfaces of the support cam 62 are clamped with the flange 54 of bushing 52 between the housing 12 and the end cover 28′ to carry the thrust load of the pitman shaft and the self-adjuster in either direction. The support cam 62 is fixed against rotation by providing this bushing at its outer peripheral edge portions with suitable notches or scalloped portions 62b for engagement with corresponding radial extending lock portions 28′a in the side cover 28′, this lock arrangement being similar to that previously described with reference to the bushing 52. This arrangement for fixing the support cam 62 against rotation by engagement with side cover 28′ is preferred since it permits rotation of the support cam 62, for a purpose to be described, during assembly prior to securing side cover 28′ to housing 12.

The slope of each of the cam ramps or cam surfaces 58a and 60a of cams 58 and 60, respectively, is small enough so that when axial force is transmitted through them to the support cam 62, the friction at the cam interface of these cam surfaces with the extension cams 62a of the support cam 62 will always be greater than the component of the force down the slope of these cam ramps so that no slipping can take place. In this manner, positive axial restraint is accomplished. Take-up for gear wear will take place at those times when there is no external force on the pitman shaft to lock the cams, such as during a reversal of the direction of force, but only at a predetermined relative rotative position of the pitman shaft 22′ in a manner to be described.

A spiral torsion spring 70 is used to bias the cams 58 and 60 relative to the support cam 62 to provide the necessary axial adjustment of the pitman shaft 22′ to provide the desired meshing force at the gear teeth of this element and of the ball nut 16, as well as to provide the subsequent take-up for wear, the spring 70 being connected at one end to an inner spring anchor, to be described, fixed for rotation with the cams 58 and 60 and at its other end is fastened to a stationary support, all in a manner to be described.

To effect this, a locking drum 72, of stepped cylindrical configuration, encircles the flange 56a and the bearing 66 in spaced relation thereto and has its enlarged end press fitted, or otherwise suitably attached, to the outer peripheral surface of outer cam 60 for rotation with this cam and therefore with cam 58. The opposite end of locking drum 72 is fixed to one end of a tubular-shaped inner spring anchor 74. As best seen in FIG. 2, the inner spring anchor 74 is provided at one end with a tubular axial extending portion of reduced diameter, and with an axial extending slot 74a though the wall thereof to receive the tang end of the inner spiral of the helical torsion spring 70, the opposite end of the spring anchor 74 being fitted into one end of the locking drum 72 and being fixed thereto as by having a plurality of equally peripheral spaced apart, radially extending tangs 74b thereon engaged through suitable apertures provided for this purpose in the locking drum 72 whereby the inner spring anchor 74 is fixed to the locking drum 72 to effect rotation of the cams 58 and 60 through it as a result of the biasing action of torsion spring 70.

At its other end, the spiral torsion spring 70 is connected to an outer spring anchor 76 which is suitably fixed to a stationary support. In the embodiment disclosed, the outer spring anchor 76, as best seen in FIG. 2, is of a cup-shaped configuration to encircle and enclose the spring 70. An axially extending slot 76a extending through the rim of this element is adapted to receive the outer spiral end of spring 70. The lip or free end of the rim of this anchor 76 is perforated, in the embodiment disclosed, to provide a plurality of spaced apart, arcuate-shaped keys 76b whereby to effect axial and rotational lock-up of this element to the support cam 62, as by engagement of these keys 76b into corresponding arcuate key slot openings 62c in support cam 62.

Since the spring 70 is wound to normally bias the cams 58 and 60 in an up-ramp direction relative to support cam 62, to effect axial adjustment of the pitman shaft, to the right with reference to FIG. 2, and since, if this adjustment is allowed to occur during turning movement of the vehicle, the pitman shaft cannot return axially and, because of this, the gears would bind. Accordingly, in accordance with the invention; a lock arrangement is provided whereby the self-adjuster will be restrained from moving the pitman shaft axially to take up for gear tooth looseness during a turn while permitting it to move the pitman shaft axially only when it is in essentially a centered position.

To effect this locking arrangement, a helical locking spring 78 is positioned to encircle the locking drum 72 with some interference fit therewith. One end of this locking spring 78 is anchored to a stationary support as by being anchored to a post 80 attached to the support cam 62 while the other end of this spring terminates in a partial loop 78a with an upstanding axially extending end 78b. The snubbing action of this spring 78 on the locking drum 72 locks it and the cams 58 and 60, to which it is attached, from moving under the influence of the torsion spring 70 in the direction of take-up or up-ramp direction unless it is released in a manner to be described hereinafter. A tension spring 82 secured at one end to the loop 78a at the free end of the locking spring 78 and at its other end to the anchor post 80 augments the snubbing action of the spring 78 to create a locking force stronger than the torque of the torsion spring 70.

Release of the locking spring 78 to allow axial take-up of the pitman shaft in the essentialy centered rotational position of this shaft and of the steering gear is accomplished by the use of a release cam 84, encircling the free end of the extension shaft outboard of flange 56a, which is provided with a radially extending cam 84a thereon positioned to contact the upstanding end 78b of locking spring 78 in a direction, counterclockwise with reference to FIG. 3, to stretch the augmenting spring 82 and to partially relieve the first coil of the locking spring 78 to a point wherein the locking torque of this spring 78 is less than the torque of the torsion spring 70. This allows rotative movement of the cams 58 and 60 relative to fixed support cam 62 to move the pitman shaft 22' axially in a direction to take up for wear.

Figure 4:
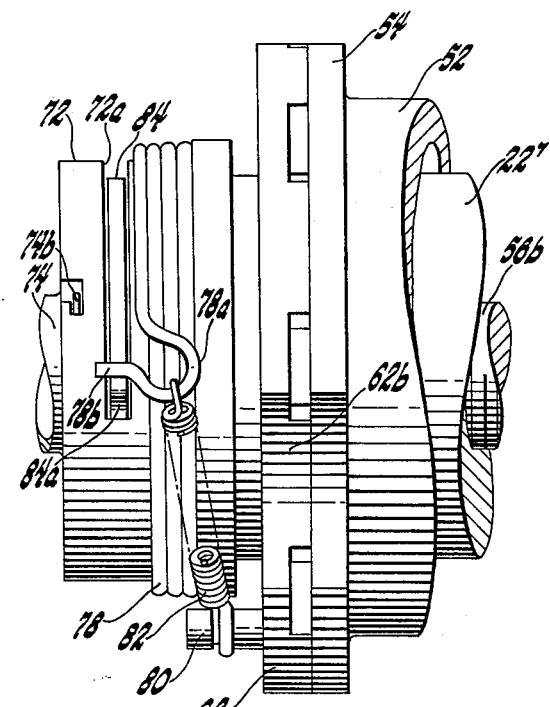
FIG. 4 is a view taken along line 4—4 of FIG. 2.
Figure 5:
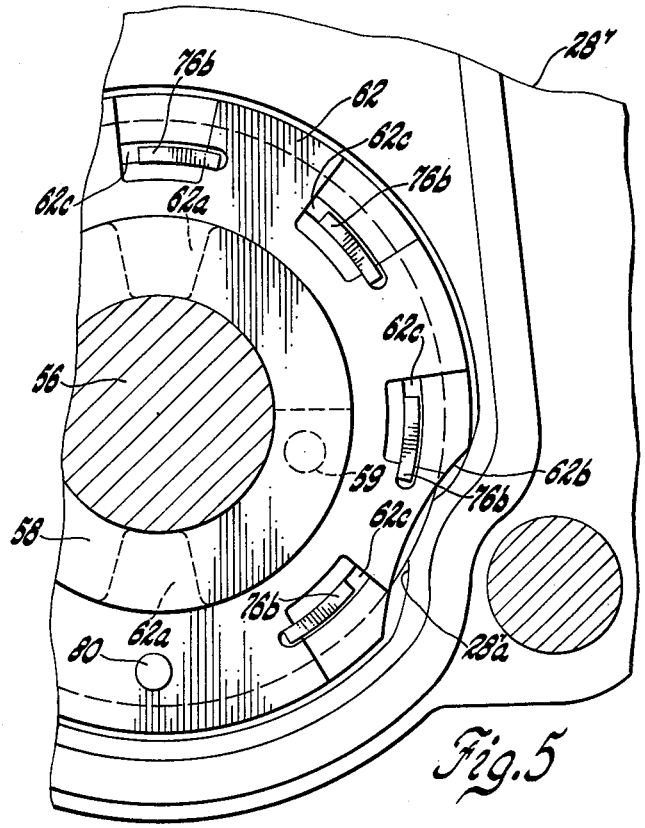
FIG. 5 is a view taken along line 5—5 of FIG. 2.

The release cam 84 is rotatably mounted on the free end of the shaft extension 56 to which it can be locked against the flange 54a by the locking screws 86 threaded into the end of this shaft extension. During assembly, the release cam 84 is rotatably adjusted to position the extending cam 84a in a proper release position relative to the upstanding end 78b of spring 78 and then it is locked to the shaft extension as by the screws 86 after the flanged shaft extension 56 has been seated on the end of the pitman shaft 22'. The radially extending cam portion 84a of the release cam 84 extends through a slot 72a extending partway around the locking drum 72, as best seen in FIG. 4, to contact the upstanding end 78b of the locking spring 78.

In operation, the only position in which release of the locking spring 78 takes place is when the spring end 78b is riding the slope of the cam portion 84a on the side that causes the augmenting spring 82 to stretch and a portion of the first coil of the locking spring 78 to unwind. With reference to FIG. 3, this occurs when the release cam 84 is rotated from its position, as shown, in a counterclockwise direction. This operating range is preferably very small so that axial take-up of the pitman shaft occurs only when the steering gear is essentially centered, the pitman shaft being correspondingly centered. Movement of the release cam in either direction outside of this range, as during normal turning to the right or left, and when the release cam 84a engages the upstanding end 78b during rotation in the opposite direction, it merely causes the spring end 78b of locking spring 78 to ride over the cam without effecting release of the locking drum 72. With this arrangement, the self-adjuster is normally locked except when the pitman shaft is in the essentially centered position.

Initial self-adjustment of the axial position of the pitman shaft 22 is accomplished during assembly of the self-adjuster to the steering gear assembly. With all of the elements of the self-adjuster assembled, as shown in FIGS. 2, 3 and 4, except for the cover 28', the support cam 62 will stand away from its seated position with respect to the housing 12 and to the flanged face of the bushing 52 due to the influence of the torsion spring 70 which biases it rotatively in a down-ramp direction with respect to the cams 58 and 60. However, installation of the cover 28' to the support cam 62 with then some rotation of these elements in a rotative direction to effect up-ramp movement relative to the cams 58 and 60 will cause the support cam to ride in the cam slots in an axial direction to permit seating of the cover 28' after which the cover is secured to the housing 12. At this time, the teeth of the pitman shaft 22' and of the ball nut 16 will be properly meshed under the spring 70-cam 58, 60–62 force and no further axial adjustment of the pitman shaft is necessary.

What is claimed is:

1. A self-adjuster for axial alignment of the pitman shaft rotatably journalled in the housing of a manual steering gear assembly, said self-adjuster including a shouldered shaft extension fixed to and extending from the inner end of the pitman shaft, said shaft extension having a radial flange adjacent to the free end thereof, a pair of annular cams rotatably supported on said shaft extension and fixed axially between said flange and the inner end of the pitman shaft, said cams each having spaced apart axial extending cam ramps thereon and being rotatively locked together to provide cam slots between said cam ramps, a support cam axially and non-rotatively fixed to the housing and having extension cams thereon extending into said cam slots whereby rotational movement of said cams relative to said extension cams of said support cam will vary the axial position of the pitman shaft, torsion spring means operatively fixed at one end of said support cam and operatively connected at its other end of said cams to normally rotatively bias said cams in an up-ramp axial take-up direction relative to said support cam, and a releasable locking means operatively connected to said cams to lock said cams against rotation by said torsion spring except during the centered steering position of the pitman shaft.

2. A self-adjuster according to claim 1 wherein said releasable locking means includes a locking drum fixed at one end to said cams and at its other end to an inner spring anchor fixed to said other end of said torsion spring, a helical locking spring fixed at one end to said support cam and having helical coils encircling said locking drum in interference fit therewith and with its other end terminating in a partial loop with an upstanding axial extending end, and augmenting tension spring fixed at one end to said loop and at its other end to said support cam and, a release cam fixed to said shaft extension for rotation therewith, and positioned to engage said upstanding axial extending end of said locking spring whereby upon rotation of the pitman shaft in one direction when the steering gear is essentially centered, said release cam engages said extending end of said locking spring to effect stretching of said augmenting tension spring and a portion of the free end coil of said locking spring to unwind to release said locking drum for rotation by said torsion spring.

3. A self-adjuster for effecting axial adjustment of the pitman shaft of a manual steering gear assembly, the pitman shaft being rotatably journalled in a housing closed adjacent to the inner end of the pitman shaft by a side cover releasably fixed to the housing, said self-adjuster including a first cam means provided with radial and arcuate extending cam slots therein, support means rotatably supporting said cam means for axial movement with the pitman shaft, a second cam means operatively engaged in said cam slots of said first cam means and fixed to the side cover, a torsion spring operatively connected at one end to said first cam means, a spring anchor connected at one end to the other end of said torsion spring and fixed at its opposite end to said second cam means whereby, during assembly, the side cover can be rotated prior to its attachment to the housing to effect rotation and therefore axial displacement of said second cam means relative to said first cam means against the biasing action of said torsion spring and, locking means, including coil spring means, operatively connected to said first cam means and actuated by a cam release operatively connected to the pitman shaft to normally lock said first cam means and said second cam means against rotation relative to each other by said torsion spring except during the centered steering position of the pitman shaft as released by said cam release.

4. A self-adjuster according to claim 3 wherein said locking means further includes a spring anchor and locking drum means fixed at one end to said first cam means and to said one end of said torsion spring, said coil spring means being fixed at one end relative to said second cam means and being wound around a portion of said spring anchor and locking drum means in a normal interference fit therewith, an augmenting spring connected at one end to the other end of said coil spring means and at its opposite end fixed relative to said second cam means and, wherein said cam release is operatively fixed to the pitman shaft and positioned so that upon rotation of the pitman shaft when the steering gear is essentially centered, said cam release will engage said other end of said coil spring means to effect unlocking of said coil spring means relative to said first cam means.

5. A self-adjuster for effecting axial adjustment of a shaft rotatively journalled in a housing closed adjacent to the inner end of the shaft by a side cover releasably fixed to the housing, said self-adjuster including a first cam means provided with radial and arcuate extending cam slots therein, support means supporting said first cam means adjacent to the inner end of the shaft for rotation relative to the shaft and for axial movement with the shaft, a second cam means operatively engaged in said cam slots of said first cam means and operatively fixed to the side cover, a torsion spring operatively connected at one end to said first cam means and at its other end to said second cam means whereby said first cam means is rotatively biased relative to said second cam means in an up-ramp direction to effect axial adjustment of the shaft within the housing and, a releasable locking means operatively connected to said first cam means and fixed relative to said second cam means to lock said first cam means against rotation relative to said second cam means by said torsion spring except during a predetermined rotative position of the shaft within the housing.

6. A self-adjuster according to claim 5 further including a spring anchor positioned to effect the connection of said other end of said torsion spring to said second cam means, said spring anchor being connected at one end to said other end of said torsion spring and being fixed at its other end to said second cam means whereby, during assembly, said side cover can be rotated prior to its attachment to the housing to effect rotation and therefore axial displacement of said second cam means relative to said first cam means against the biasing action of said torsion spring.

7. A self-adjuster according to claim 5 wherein said releasable locking means includes a spring anchor and locking drum means fixed to said one end of said torsion spring and to said first cam means, a coil spring fixed at one end relative to said second cam means with the coils of said coil spring normally encircling a portion of said spring anchor and locking drum means in locking interference fit therewith, and augmenting tension spring connected at one end to the other end of said coil spring and fixed at its other end relative to said second cam means and, a release cam operatively fixed to the shaft and positioned so that upon rotation of the shaft in one direction at a predetermined rotative position of the shaft said release cam will engage said other end of said coil spring to effect unlocking of said coil spring relative to said spring anchor and locking drum means to permit rotation of said first cam means relative to said second cam means by said torsion spring.

* * * * *